(12) United States Patent
Verdecchia

(10) Patent No.: US 6,299,128 B1
(45) Date of Patent: Oct. 9, 2001

(54) DIAPHRAGM ORIFICE FOR FLUSHOMETER

(75) Inventor: William A. Verdecchia, Erie, PA (US)

(73) Assignee: Zurn Industries, Inc., Erie, PA (US)

( * ) Notice: Subject to any disclaimer, the term of this patent is extended or adjusted under 35 U.S.C. 154(b) by 0 days.

(21) Appl. No.: 09/356,739

(22) Filed: Jul. 19, 1999

Related U.S. Application Data
(60) Provisional application No. 60/094,994, filed on Jul. 31, 1998.

(51) Int. Cl.[7] .................................................. F16K 31/126
(52) U.S. Cl. .................................. 251/40; 251/35; 138/45
(58) Field of Search ........................ 138/45; 251/30.01, 251/30.02, 40, 35

(56) References Cited

U.S. PATENT DOCUMENTS

| | | | |
|---|---|---|---|
| 2,705,608 | * 4/1955 | Phillips | 251/30.03 |
| 2,775,984 | 1/1957 | Dahl | 138/45 |
| 2,899,979 | * 8/1959 | Dahl et al. | 138/45 |
| 2,937,658 | 5/1960 | Stewart | 137/505 |
| 2,941,544 | 6/1960 | Peras | 137/525 |
| 3,121,445 | 2/1964 | Wisniewski | 138/45 |
| 3,474,383 | 10/1969 | Mahon et al. | 339/33 |
| 3,684,013 | 8/1972 | Brown | 166/224 |
| 3,833,019 | 9/1974 | Diggs | 138/45 |
| 4,091,996 | 5/1978 | Nelson | 239/177 |
| 4,105,050 | 8/1978 | Hendrickson et al. | 138/45 |
| 4,130,128 | 12/1978 | Kaneko | 137/269 |
| 4,132,364 | 1/1979 | Harmony | 239/542 |
| 4,161,965 | 7/1979 | Merritt | 138/45 |
| 4,165,764 | 8/1979 | Grandclement | 138/43 |
| 4,182,356 | 1/1980 | Woodford, Sr. | 137/59 |
| 4,191,204 | 3/1980 | Nehring | 137/205 |
| 4,198,031 | 4/1980 | Ezekiel et al. | 251/117 |
| 4,248,270 | * 2/1981 | Ostrowski | 138/45 |
| 4,327,891 | 5/1982 | Allen et al. | 251/38 |
| 4,332,494 | 6/1982 | Kingsford | 401/5 |
| 4,347,866 | 9/1982 | Straus | 137/436 |
| 4,420,845 | 12/1983 | Antunez | 4/366 |
| 4,492,339 | * 1/1985 | Kreitzberg | 138/45 X |
| 4,494,562 | 1/1985 | Stephens | 137/436 |
| 4,667,700 | 5/1987 | Buzzi | 138/45 |
| 4,754,897 | * 7/1988 | Brace | 138/45 X |
| 4,938,245 | 7/1990 | Schoepe et al. | 137/2 |
| 5,027,861 | * 7/1991 | Gute | 138/45 |
| 5,082,240 | 1/1992 | Richmond | 251/120 |
| 5,154,394 | * 10/1992 | DuHack | 138/45 X |
| 5,213,303 | * 5/1993 | Walker | 251/30.02 |
| 5,213,305 | 5/1993 | Whiteside et al. | 251/40 |
| 5,232,194 | * 8/1993 | Saadi et al. | 251/40 |
| 5,294,058 | 3/1994 | Einav | 239/533.1 |
| 5,363,873 | 11/1994 | Richmond | 137/1 |
| 5,456,279 | 10/1995 | Parsons et al. | 137/245 |
| 5,617,899 | 4/1997 | Linton et al. | 138/44 |
| 5,813,652 | * 9/1998 | Richmond et al. | 138/45 X |

\* cited by examiner

Primary Examiner—Kevin Shaver
Assistant Examiner—John Bastianelli
(74) Attorney, Agent, or Firm—Webb Ziesenheim Logsdon Orkin & Hanson, P.C.

(57) ABSTRACT

A unitary diaphragm assembly for use primarily in conventional flush valves. The diaphragm assembly has a flexible diaphragm which includes a sealing portion and a mounting portion at the outer peripheral edge. A flow ring is positioned adjacent the sealing portion of the diaphragm. An elongated barrel member extends from the diaphragm in a longitudinal direction and includes a plurality of radial guides positioned circumferentially around the outer surface of the barrel member along a portion of the length of the barrel member. The diaphragm defines an orifice having a ring portion that flexes when a pressure difference is applied across the orifice thereby increasing the flow rate across the diaphragm. The orifice has a smaller diameter at a first end relative to a second end of the orifice. A method of compensating for a pressure difference across the diaphragm is also disclosed.

28 Claims, 3 Drawing Sheets

DIAPHRAGM ORIFICE FOR FLUSHOMETER

CROSS-REFERENCED TO RELATED APPLICATION

This application claims the benefit of U.S. Provisional Application Ser. No. 60/094,994 filed Jul. 31, 1998, entitled "Diaphragm Orifice for Flushometer".

BACKGROUND OF THE INVENTION

1. Field of the Invention

This invention relates in general to flush valves for water closets, urinals and other plumbing equipment. More particularly, the invention relates to an improved diaphragm for use in flush valves.

2. Description of the Prior Art

Flush valves in water closets, urinals and other plumbing devices which utilize a flexible diaphragm to establish and to seal off the connection between the inlet and outlet are well-known in the art. Typically, the diaphragm is made of an elastomeric material, such as rubber, and includes a bypass which provides fluid communication between the inlet side of the flush valve and an upper chamber of the flush valve. A typical prior art diaphragm is shown in FIG. 1 of U.S. Pat. No. 5,232,194 to Saadi et al. (hereinafter "the Saadi patent"), and is incorporated herein by reference.

The Saadi patent also discloses a unitary diaphragm assembly that includes a diaphragm having a cylindrically-shaped bypass orifice formed therein and is illustrated in FIGS. 2 and 3 of the present patent application.

The performance of prior art diaphragms varies depending on the pressure drop between the opposite sides of the diaphragm due to the bypass orifice. Specifically, a higher pressure difference across the diaphragm, such as will occur on a bottom floor of a multistory building, causes more water to pass through the flush valve for a fixed period of time when the flush valve is activated. Likewise, in a situation where there is a low pressure difference across the diaphragm, less water will flow through the flush valve when it is activated. Hence, the amount of water flowing through the flush valve is a function of the supply of water pressure to the flush valve.

Therefore, it is an object of the present invention to provide an improved diaphragm orifice to compensate for pressure differentials across the diaphragm and improve valve performance.

SUMMARY OF THE INVENTION

The present invention is a barrier for separating fluid and is configured to have a pressure difference applied across the barrier. The barrier includes a flexible diaphragm having a first side and a second side and defines an orifice extending from the first side to the second side. The orifice has a first end defined in the first side and a second end defined in the second side of the diaphragm. The first end has a diameter less than the diameter of the second end. The second end of the diaphragm is concave and the first side of the diaphragm is convex when the pressure difference is applied across the barrier whereby the diameter of the first end increases.

The present invention is also a diaphragm orifice for a valve such as a flush valve. The flush valve made in accordance with the present invention generally includes a valve body defining an inlet connection and an outlet connection, and a unitary diaphragm assembly positioned in the valve body. The unitary diaphragm assembly separates and seals off the inlet connection from the outlet connection. The unitary diaphragm assembly is configured to have a pressure difference applied across the assembly.

The unitary diaphragm assembly further includes a flexible diaphragm. The flexible diaphragm has a mounting portion at a peripheral edge for mounting the diaphragm assembly within the flush valve. The diaphragm has a first side and a second side and defines an orifice extending from the first side to the second side. The orifice has a first end defined in the first side and a second end defined in the second side of the diaphragm. The first end has a diameter less than the diameter of the second end. The orifice extends from the first end to the second end. The second side of the diaphragm is concave and the first side of the diaphragm is convex when the pressure difference is applied across the assembly whereby the diameter of the first end increases.

The first end of the orifice is defined by a first portion of the diaphragm. The second end of the orifice is defined by a second portion of the diaphragm. The second portion is positioned adjacent the first portion. The first portion includes a tapered surface that preferably extends at an angle of about 45° from a horizontal plane passing through the diaphragm. Preferably the diaphragm is made of an elastomeric material, such as rubber or a thermoplastic elastomer resin, and is flexible.

The diaphragm of the unitary diaphragm assembly may be annular-shaped and may have a sealing surface. The unitary diaphragm assembly may further include a flow ring adjacent the sealing surface. An elongated barrel member may be formed adjacent the flow ring. The barrel member may have a first end or top end. A plurality of radial guides may be formed circumferentially around an outer surface of the barrel member and may extend along at least a portion of a longitudinal length of the barrel member. Additionally, the unitary diaphragm assembly may include a relief valve seat at the first end of the barrel member. The relief valve seat may be configured to seal against a relief valve of the flush valve.

In operation, a pressure difference across the diaphragm causes the diaphragm to flex. A greater pressure difference across the diaphragm will cause the diaphragm to flex more than a lesser pressure difference. The amount of flex affects the pressure sensitivity of the flush valve and improves the overall performance of the flush valve. Further, the flexing improves the flush valve's resistance to clogging. The flexing action can free debris that would normally clog a non-elastomeric orifice. Examples of this debris include sediment and water deposits such as scale.

The present invention is also a method of compensating for a pressure difference across the barrier discussed above. The method includes the steps of applying the pressure difference across the diaphragm and flexing the diaphragm. The pressure difference is applied such that pressure on the first side of the diaphragm is lower than the pressure on the second side of the diaphragm. The diaphragm is flexed such that the second side of the diaphragm is concave and the first side of the diaphragm is convex whereby the diameter of the first end increases and fluid flows through the orifice. The method may also include the step of positioning the diaphragm in the flush valve discussed above between the inlet connection and the outlet connection of the flush valve.

Further details and advantages of the present invention will become apparent from the following detailed description in conjunction with the drawings wherein like reference characters identify like parts throughout.

DESCRIPTION OF THE PREFERRED EMBODIMENTS

Figure 1:
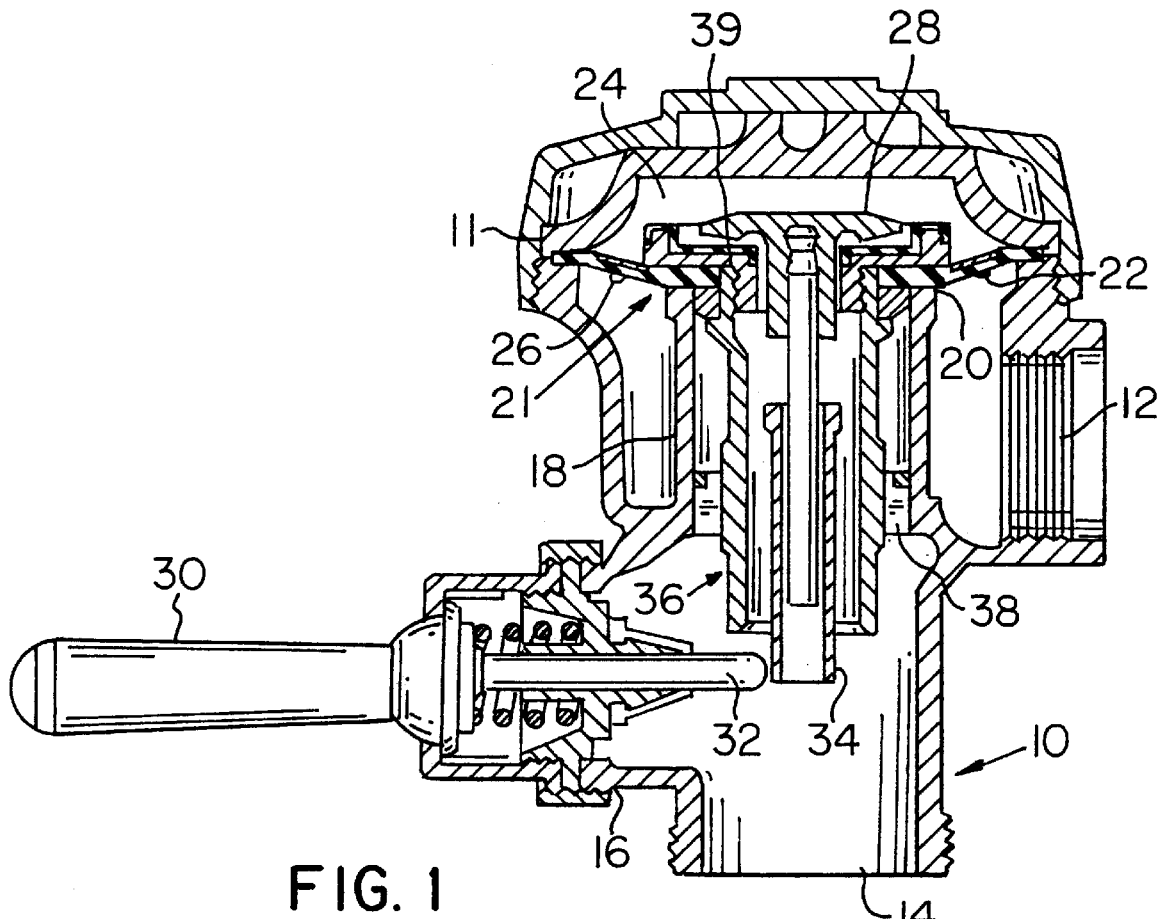
FIG. 1 is a partial sectional view of a prior art flush valve and conventional diaphragm assembly.

Flush valves in water closets, urinals and other plumbing devices which utilize a flexible diaphragm to establish and to seal off the connection between the inlet and outlet are well-known in the art. FIG. 1 illustrates a typical prior art flush valve and diaphragm assembly. The flush valve has a hollow body 10, generally made of brass, which includes an inlet connection 12, an outlet connection 14 and a handle connection 16. A barrel 18 is positioned within the flush valve such that the connection between the inlet 12 and the outlet 14 is through the barrel 18. An annular main valve seat 20 is formed on a first or top end 21 of the barrel 18. The annular main valve seat 20 is normally closed by a diaphragm 22 extending across the body 10 and defining an upper chamber 24. The diaphragm 22 has a bypass 26 which provides fluid communication between the inlet side of the flush valve and the upper chamber 24. The diaphragm 22 is attached at its outer edge to the valve body and is clamped in place by an annular clamping rim on an outer cover 11 of the body 10. The diaphragm 22 has an opening which allows for fluid communication between the upper chamber 24 and the outlet 14. A relief valve 28 normally closes the opening at the center of the diaphragm 22.

The operation of the flush valve is generally as follows. In the normally closed position shown in FIG. 1, water pressure at the valve inlet is communicated to the upper chamber 24 through the bypass 26. Since the surface area which is subjected to water pressure is greater on the upper side of the diaphragm 22, the water pressure forces the diaphragm 22 down onto the main valve seat 20 preventing water from flowing to the outlet 14. When the user moves a handle 30 in any direction, a plunger 32 moves inwardly tilting a stem 34 of the relief valve 28. This releases the pressure in upper chamber 24 by allowing water to flow through a guide member 36. With the upper chamber pressure relieved, the inlet water pressure forces the diaphragm 22 upwardly, off the main valve seat 20 allowing water to flow directly from the inlet 12 through the barrel 18 to the outlet 14. When the diaphragm 22 and the relief valve 28 move upwardly, the relief valve 28 resets itself, closing off the upper chamber 24. Water will then flow through the bypass 26 into the upper chamber 24 until the diaphragm 22 is again forced against the main valve seat 20, thereby closing the valve. The guide member 36 moves with the diaphragm 22 and includes outwardly extending radial wing members 38 which engage the inner surface of the barrel 18 to guide the guide member 36 and the attached diaphragm 22 as the diaphragm 22 moves up and down. The diaphragm 22 defines a central passageway 39 (i.e., hole). The bypass 26 is radially spaced from the central passageway 39.

Figure 2:
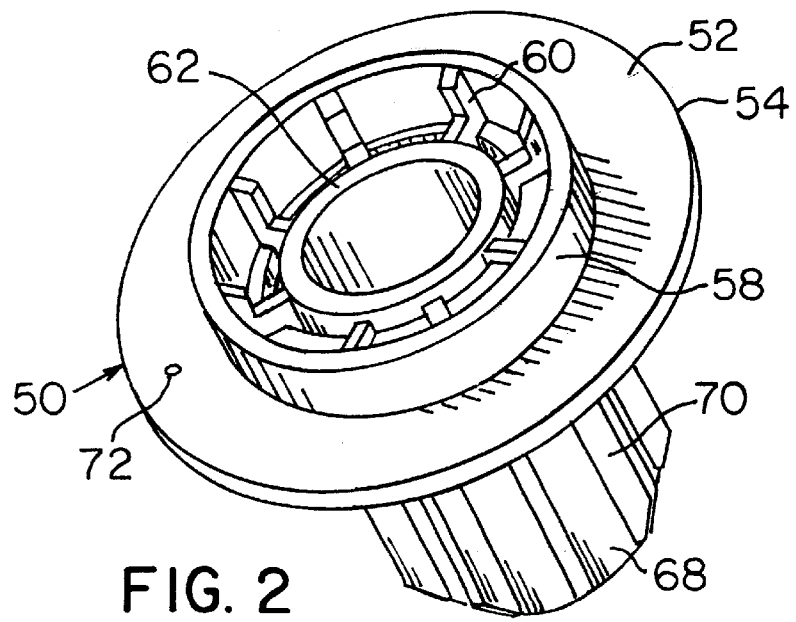
FIG. 2 is a perspective view of a prior art unitary diaphragm assembly.
Figure 3:
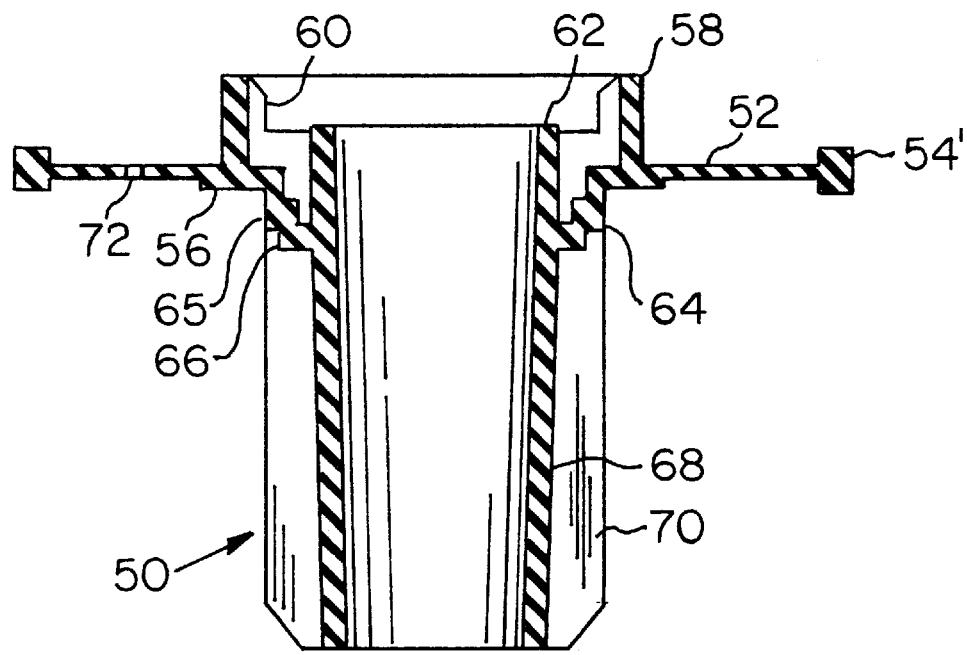
FIG. 3 is a sectional view of the unitary diaphragm assembly shown in FIG. 2.

FIGS. 2 and 3 show a prior art unitary diaphragm assembly 50. FIG. 2 illustrates the unitary diaphragm assembly 50 which is designed to be utilized in flush valves of the type illustrated in FIG. 1, replacing the complicated diaphragm assembly of these devices. The unitary diaphragm assembly 50 is molded as a single piece from a thermoplastic elastomer resin or rubber. The unitary diaphragm assembly 50 includes a flexible and sealing diaphragm 52 which has a mounting portion 54 at an outer peripheral edge. The mounting portion 54 may be assembled into a "C" channel-type gasket.

With reference to FIG. 3, a sealing surface 56 is positioned at a generally radially inward position relative to the diaphragm 52 so as to cooperate with the main valve seat 20 of the flush valve. An annular support 58 extends upwardly from the diaphragm 52 above the portion of the diaphragm having the sealing surface 56. Radial reinforcing ribs 60 extend between the upper end of a barrel member 68 adjacent a relief valve seat 62 and the annular support 58 to reinforce the annular support 58, the relief valve seat 62 and the sealing surface 56. The vertical legs of the ribs 60 maintain the relief valve 28 of the flush valve in position so that it may seal against the relief valve seat 62. The reinforcing ribs 60 also extend to a flow ring 64 located on the barrel member 68 below the sealing surface 56 to add structural support for the flow ring 64.

The relief valve seat 62 is positioned on the upper end of the barrel member 68. The barrel member 68 is designed to cooperate with the barrel 18 of the flush valve and extends substantially coaxially along the length of the barrel 18. The outer surface of the barrel member 68 is provided with radial guides 70. The guides 70 engage the inner surface of the barrel 18 to maintain the unitary diaphragm assembly 50 in proper alignment as it moves up and down in the barrel 18. The flow ring 64 controls the flow of water when the unitary diaphragm assembly 50 is in the open position. The guides 70 also provide structural support to the flow ring 64. The guides 70 may extend substantially along the entire length of the barrel member 68, as shown, for ease of manufacture. Alternatively, the guides 70 may extend only along a portion of the barrel member 68. Additionally, the guides 70 may serve to support a supplemental flow control ring (not shown) which is positioned within the barrel 18.

FIG. 3 also illustrates a modified mounting portion 54' of the diaphragm 52. The modified mounting portion 54' has a greater thickness than the mounting portion 54 shown in FIG. 2. This design eliminates the need for the "C" channel-type gasket.

The flow ring 64 includes a first stage 65 having a diameter larger than a second stage 66 which creates a steeped configuration of the flow ring. The size and shape of the flow ring 64 may be modified for different flush valve flow requirements.

The unitary diaphragm assembly 50 is also provided with a bypass orifice 72 which is defined in the diaphragm 52. The unitary diaphragm assembly 50 is designed to operate in an analogous manner to the diaphragm assembly of the prior art as shown, for example, in FIG. 1.

Figure 4:
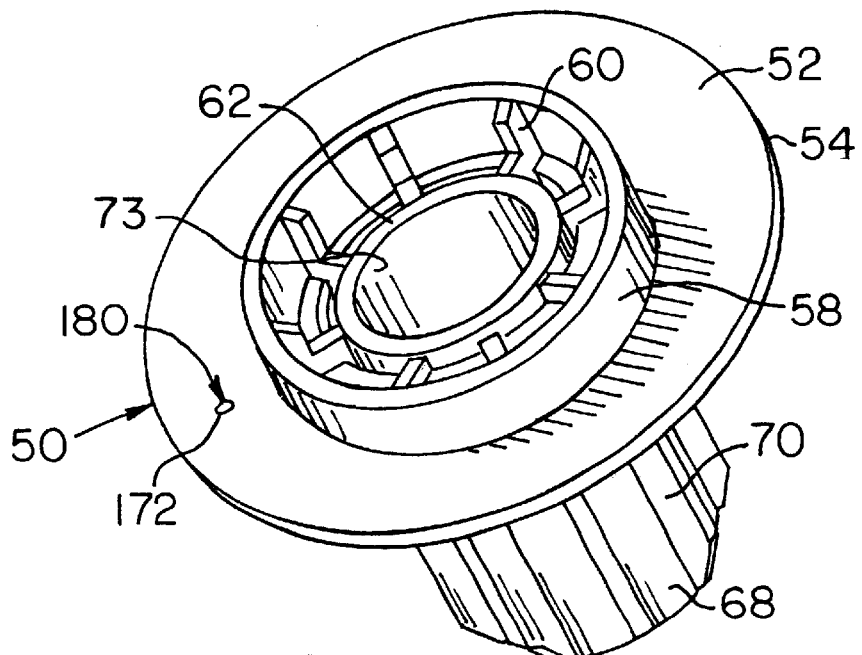
FIG. 4 is a perspective view of a unitary diaphragm assembly made in accordance with the present invention.
Figure 5:
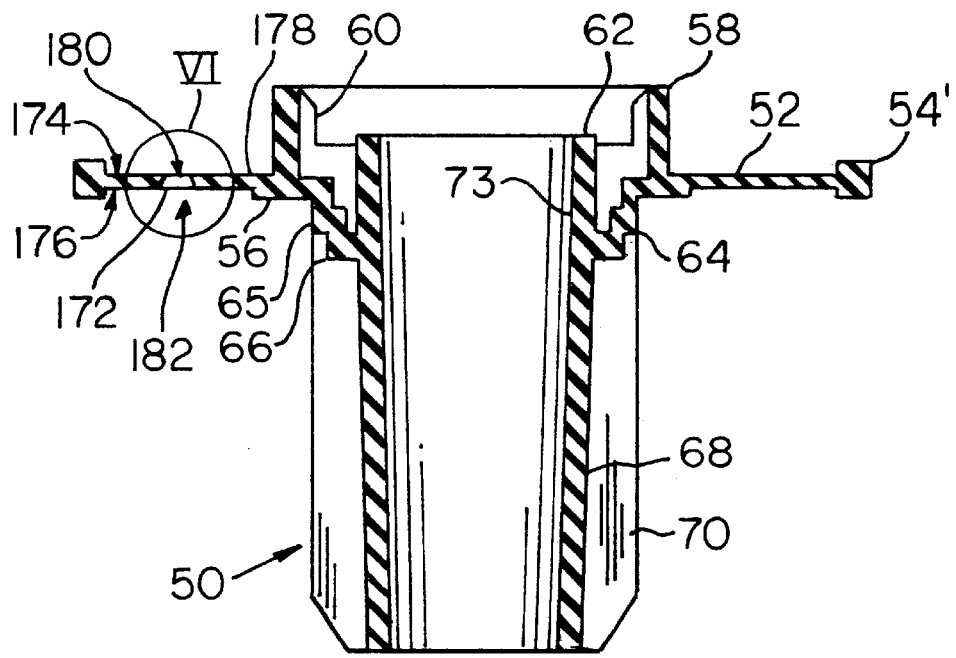
FIG. 5 is a sectional view of the unitary diaphragm assembly shown in FIG. 4.

FIGS. 4 and 5 show a unitary diaphragm assembly 50 made in accordance with the present invention that is similar to that shown in FIG. 3 with the exception of the bypass orifice 72 being replaced by orifice 172. In FIGS. 4 and 5, the unitary diaphragm assembly 50, or diaphragm body, defines a central passageway 73 (i.e., hole). The orifice 172, as shown in FIG. 4, is radially spaced from the central passageway 73.

Figure 6:
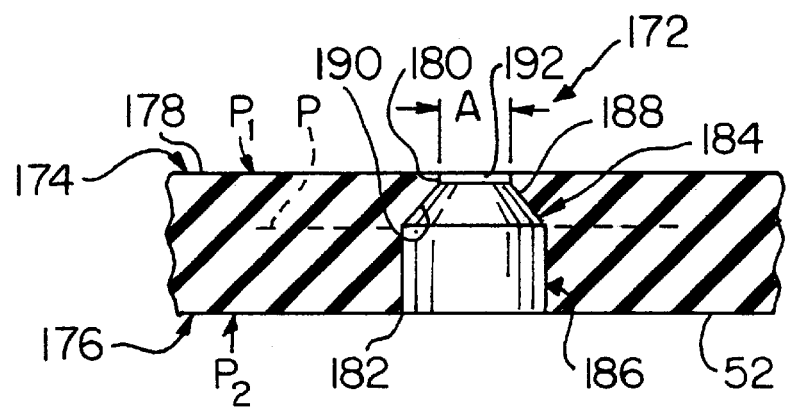
FIG. 6 is a sectional view of a portion of the unitary diaphragm assembly shown in FIG. 5 with the diaphragm orifice in a first position.
Figure 7:
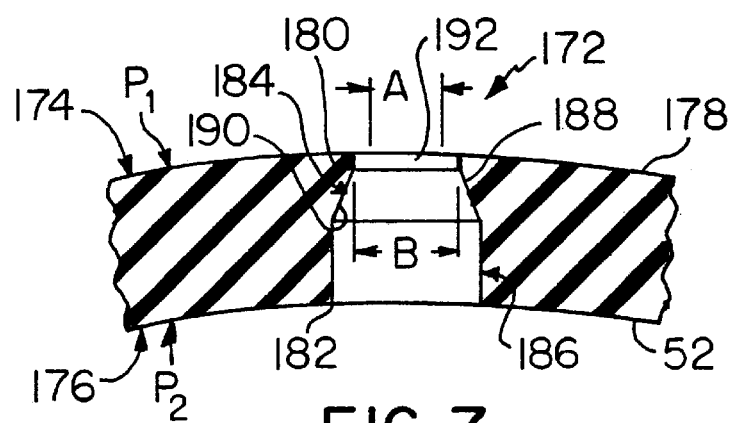
FIG. 7 is a sectional view of a portion of the unitary diaphragm assembly shown in FIG. 5 with the diaphragm orifice in a second position.

Referring to FIGS. 5–7, the diaphragm 52 of the diaphragm assembly 50 includes a first side 174 and a second side 176. The first side 174 of the diaphragm 52 is a low pressure side of the diaphragm assembly 50 and the second side 176 of the diaphragm 52 is a high pressure side of the diaphragm assembly 50 when the flush valve is activated. The orifice 172 extends from the first side 174 to the second side 176. The orifice 172 is defined in a portion 178 of the diaphragm 52. The orifice 172 includes a first end or outlet end 180 and a second end or inlet end 182. The first end 180 is defined by a first portion 184 formed in the diaphragm 52. The second end 182 is defined by a second portion 186 which is formed in the diaphragm 52 adjacent the first portion 184. The first portion 184 includes a ring portion 188 formed in the diaphragm 52. The ring portion 188 is tapered at an angle from a horizontal plane P passing through the diaphragm 52 and defines a frusto-conical shaped portion of the orifice 172. The second portion 186 of the second end 182 of the orifice 172 is cylindrical in shape.

Alternatively, the ring portion 188 can take other shapes and need not be tapered at all, but can be in the shape of an untapered ring having a diameter less than the diameter of the second portion 186. In this embodiment, the diameter of the second end 182 is greater than the diameter of the first end 180.

Referring to FIG. 6, a wall thickness of the first portion 184 is defined as the vertical distance between the plane P and the first side 174 of the diaphragm 52. A thickness or height of the diaphragm 52 is defined as the vertical distance between the first side 174 and the second side 176. The first end 180 of the orifice 172 also has a diameter A, as is discussed in detail hereinafter.

FIG. 6 shows the portion 178 of the diaphragm 52 containing the orifice 172 where pressures $P_1$ and $P_2$ on opposite sides of the orifice 172 are the same or approximately the same. Preferably, the ring portion 188 has an inner surface 190 that extends at an angle of about 45° from the horizontal plane P passing through the portion 178 when the pressure $P_1$ and $P_2$ on opposite sides of the orifice 172 are the same or approximately the same. The first portion 184 of the first end 180 may further include an untapered portion 192 formed in the first side 174 of the diaphragm 52. The untapered portion 192 is formed in the diaphragm 52 adjacent the first portion 184 and meters the water through the orifice 172 for proper cycle time as discussed further hereinafter.

FIG. 7 shows the portion 178 of the diaphragm 52 containing the orifice 172 having a pressure difference $\Delta P$ ($P_2>P_1$) across the diaphragm, wherein the pressure $P_2$ adjacent the second end 182 is greater than the pressure $P_1$ adjacent the first end 180. This condition exists immediately after the flush valve is activated and during the period of time thereafter when water flows through the orifice 172 until the diaphragm 52 is forced against the main valve seat 20 thereby closing the flush valve. Therefore, the first side 174 of the diaphragm 52 is the low pressure side of the diaphragm assembly 50 and the second side 176 of the diaphragm 52 is the high pressure side of the diaphragm assembly 50 when the flush valve is activated.

The diaphragm assembly 50 is intended to be positioned in the flush valve shown, for example, in FIG. 1. The diaphragm assembly 50 is positioned in the valve body 10 and generally separates the inlet connection 12 and the outlet connection 14 and, preferably, seals off the inlet connection 12 from the outlet connection 14. The diaphragm assembly 50 is thus a barrier between the inlet connection 12 and the outlet connection 14, with the orifice 172 providing for fluid communication between the inlet connection 12 and the outlet connection 14. The barrier, or diaphragm assembly 50, has a pressure difference $\Delta P$ ($P_2>P_1$) across the barrier and, specifically, across the diaphragm 52 when the flush valve is activated, as discussed above.

As can be seen in FIG. 7, the ring portion 188 is flexed as a result of the pressure difference $\Delta P$ ($P_2>P_1$), thereby increasing the diameter of the first end 180 from A to B. In other words, at least a portion of the diameter of the orifice 172 increases due to the pressure differential $\Delta P$. Additionally, the inner surface 190 now extends at an angle greater than about 45° from the horizontal plane P passing through the portion 178 as a result of the flexing of the ring portion 188. The diaphragm 52 is therefore made of a thermoplastic elastomer resin or other similar material that permits flexing, such as rubber. The greater the pressure difference $\Delta P$ ($P_2>P_1$), the more the ring portion 188 flexes and the greater the diameter B becomes. The flexing of the ring portion 188 increases the flow rate across the diaphragm 52. This, in turn, causes the flushometer valve's cycle time to decrease with increasing supply pressures. The faster cycle times affect the overall performance of the flush valve. In other words, the total volume of water flowing through the urinal or other flushing device for a given cycle remains relatively constant and is not a function of the water pressure. In particular, the lower the pressure difference $\Delta P$ ($P_2>P_1$) across the diaphragm 52, which is indicative of the water supply pressure, the lesser the value of the diameter B. Further, the greater the pressure difference $\Delta P$ ($P_2>P_1$) across the diaphragm 52, the greater the value of the diameter B. As the diameter B increases, the cycle time of the flush valve decreases so that a relatively consistent volume of water passes through the flush valve for a cycle irrespective of the water supply pressure. $P_2$ equals $P_1$ after the cycle is complete. A cycle is defined as the period of time from when the flush valve is opened until the flush valve is closed.

The untapered portion 192 also affects cycle time. The greater the diameter and the thickness of the untapered portion 192, the greater the quantity of water will be metering or passing through the orifice 172. Thus, the greater the diameter and the thickness of the untapered portion 192, the greater the flow rate through the orifice 172, which decreases the cycle time of the flush valve.

A suitable size of the diameter A is about 0.0201" in the unflexed state of the diaphragm 52 shown in FIG. 6, and a suitable size of the diameter B is about 0.0264" in the flexed state of the diaphragm 52 shown in FIG. 7. The second end of 182 of the orifice 172 has a diameter of about 0.094" in the unflexed state of the diaphragm 52. Furthermore, the first end 180 has a wall thickness of about 0.032" and the diaphragm 52 has a thickness or height of about 0.100" in the unflexed state of the diaphragm 52. The forgoing dimensions are merely illustrative of possible dimensions for the orifice 172 and the diaphragm 52, and will change depending on the particular application at hand.

In addition to the reduced flushometer valve pressure sensitivity and the improved valve performance, the elastomeric orifice is resistant to clogging. The skin, or surface, of the elastomeric material stretches during operation. This action frees debris that would normally clog a non-elastomeric orifice. This debris includes sediment and water deposits such as scale.

In an alternative embodiment, the orifice 172 can be provided in the diaphragm 22 in lieu of the bypass 26. In either case, the diaphragm 22 or diaphragm 52, the first portion 184 of the diaphragm can be positioned between the first end 180 and the second end 182 as well adjacent the first end 180 or the second end 182. For example, the diameter of the first end 180 can equal the diameter of the second end 182, but the diameter A of the first portion 184 is less than the diameters of the first end 180 and the second end 182 and the first portion 184 is positioned between the first end 180 and the second end 182. FIGS. 6 and 7 show the first portion 184 adjacent the first end 180. In either case, the first portion 184 thickness is less than the thickness of the diaphragm 52 or 22, so that the orifice 172 has a diameter which is not constant throughout the entire length of the orifice 172.

Although this invention has been described with reference to preferred embodiments, obvious modifications and alterations of the invention may be made without departing from the spirit and scope of the invention. The scope of the present invention is defined by the appended claims and equivalents thereto.

What is claimed is:

1. A flush valve diaphragm assembly for use in a flush valve, comprising;
    a flush valve diaphragm having a flexible diaphragm body having a first side and a second side and defining a bypass orifice extending from the first side to the second side; and an elongated barrel member attached to the diaphragm, at least one of the diaphragm and barrel defining a central passageway, the bypass orifice radially spaced from the central passageway,
    wherein the bypass orifice has a first end and a second end, wherein the bypass orifice extends from the first end to the second end, and wherein the bypass orifice has a diameter which is not constant throughout the entire length of the bypass orifice and wherein the second side of the diaphragm body is concave and the first side of the diaphragm body is convex when a pressure difference is applied across the diaphragm body whereby the diameter of the first end increases.

2. A flush valve diaphragm assembly for use in a flush valve, comprising:
    a flush valve diaphragm having a flexible diaphragm body having a first side and a second side and defining; and an elongated barrel member attached to the diaphragm, at least one of the diaphragm and barrel defining a central passageway, the bypass orifice radially spaced from the central passageway,
    wherein the bypass orifice has a first end defined in the first side and a second end defined in the second side of the diaphragm body,
    wherein the first end has a diameter less than the diameter of the second end, and
    wherein the second side of the diaphragm body is concave and the first side of the diaphragm body is convex when a pressure difference is applied across the diaphragm body whereby the diameter of the first end increases.

3. The flush valve diaphragm assembly of claim 2, wherein the first end of the bypass orifice is defined by a first portion of the diaphragm body.

4. The flush valve diaphragm assembly of claim 3, wherein the second end of the bypass orifice is defined by a second portion of the diaphragm body, and wherein the second portion is positioned adjacent the first portion.

5. The flush valve diaphragm assembly of claim 3, wherein the first portion includes a tapered surface.

6. The flush valve diaphragm assembly of claim 5, wherein the tapered surface is tapered at an angle of 45° from a horizontal plane passing through the diaphragm body.

7. The flush valve diaphragm assembly of claim 2, wherein the diaphragm body is made of a thermoplastic elastomer resin.

8. A flush valve diaphragm assembly for use in a flush valve, comprising;
    a flexible diaphragm body having a mounting portion at a peripheral edge for mounting the flush valve diaphragm within the flush valve, the diaphragm body having a first side and a second side and defining a bypass orifice extending from the first side to the second side and an elongated barrel member attached to the diaphragm, at least one of the diaphragm and barrel defining a central passageway, the bypass orifice and radially spaced from the central passageway,
    wherein the bypass orifice has a first end defined in the first side and a second end defined in the second side of the diaphragm body,
    wherein the first end has a diameter less than the diameter of the second end, and
    wherein the second side of the diaphragm body is concave and the first side of the diaphragm body is convex when a pressure difference is applied across the diaphragm body whereby the diameter of the first end increases.

9. The flush valve diaphragm assembly of claim 8, wherein the first end of the bypass orifice is defined by a first portion of the diaphragm body.

10. The flush valve diaphragm assembly of claim 9, wherein the second end of the bypass orifice is defined by a second portion of the diaphragm body, and wherein the second portion is positioned adjacent the first portion.

11. The flush valve diaphragm assembly of claim 9, wherein the first portion includes a tapered surface.

12. The flush valve diaphragm assembly of claim 11, wherein the tapered surface is tapered at an angle of 45° from a horizontal plane passing through the diaphragm body.

13. The flush valve diaphragm assembly of claim 8, wherein the diaphragm body is made of a thermoplastic elastomer resin.

14. A flush valve, comprising:
    a valve body defining an inlet connection and an outlet connection; and
    a diaphragm assembly positioned in the valve body and separating the inlet connection and the outlet connection, with the diaphragm assembly configured to have a pressure difference applied across the assembly and said diaphragm assembly comprising:
        a flexible diaphragm body having a first side and a second side and defining a bypass orifice extending from the first side to the second side and an elongated barrel member attached to the diaphragm, at least one of the diaphragm and barrel defining a central passageway, the bypass orifice radially spaced from the central passageway,
        a flow ring adjacent the sealing surface,
        the elongated barrel member positioned adjacent the flow ring;
        a plurality of radial guides formed circumferentially around an outer surface of the barrel member and extending along at least a portion of a longitudinal length of the barrel member, and
        a relief valve seat at the first end of the barrel member, the relief valve seat configured to seal against a relief valve of the flush valve,
    wherein the orifice has a first end defined in the first side and a second end defined in the second side of the diaphragm, wherein the first end has a diameter less than the diameter of the second end, and wherein the second side of the diaphragm is concave and the first side of the diaphragm is convex when the pressure difference is applied across the assembly whereby the diameter of the first end increases.

15. The flush valve of claim 14, wherein the first end of the orifice is defined by a first portion of the diaphragm.

16. The flush valve of claim 15, wherein the second end of the orifice is defined by a second portion of the diaphragm, and wherein the second portion is positioned adjacent the first portion.

17. The flush valve of claim 15, wherein the first portion includes a tapered surface.

18. The flush valve of claim 17, wherein the tapered surface is tapered at an angle of 45° from a horizontal plane passing through the diaphragm.

19. The flush valve of claim 14, wherein the diaphragm is made of a thermoplastic elastomer.

20. A method of compensating for a fluid pressure difference across a flush valve diaphragm separating fluid within a flush valve, the method comprising the steps of:

a flush valve diaphragm assembly for use in a flush valve, comprising:

providing a flush valve diaphragm having a flexible diaphragm body having a first side and a second side and defining a bypass orifice extending from the first side to the second side; and an elongated barrel member attached to the diaphragm, at least one of the diaphragm and barrel defining a central passageway, the bypass orifice radially spaced from the central passageway, wherein the bypass orifice has a first end and a second end, wherein the bypass orifice extends from the first end to the second end, and wherein the bypass orifice has a diameter which is not constant throughout the entire length of the bypass orifice and wherein the second side of the diaphragm body is concave and the first side of the diaphragm body is convex when a pressure difference is applied across the diaphragm body whereby the diameter of the first end increases;

positioning the flush valve diaphragm in the flush valve between an inlet connection and an outlet connection of the flush valve;

applying the pressure difference across the diaphragm body such that the pressure on the first side of the diaphragm body is lower than the pressure on the second side of the diaphragm body; and flexing the diaphragm body such that the second side of the diaphragm body is concave and the first side of the diaphragm body is convex whereby the diameter of at least a portion of the bypass orifice increases as fluid flows through the bypass orifice.

21. The flush valve of claim 14, wherein the diaphragm assembly is a unitary assembly.

22. A flush valve, comprising:

a valve body defining an inlet connection and an outlet connection; and a diaphragm assembly positioned in the valve body and separating the inlet connection and the outlet connection, with the diaphragm assembly configured to have a pressure difference applied across the assembly and further comprising:

a flexible diaphragm body having a first side and a second side and defining a bypass orifice extending from the first side to the second side;

an elongated barrel member attached to the diaphragm, at least one of the diaphragm and barrel defining a central passageway, the bypass orifice radially spaced from the central passageway; and a relief valve seat at the first end of the barrel member, the relief seat configured to seal against a relief valve of the flush valve, wherein the orifice has a first end defined in the first side and a second end defined in the second side of the diaphragm, wherein the first end has a diameter less than the diameter of the second end, and wherein the second side of the diaphragm is concave and the first side of the diaphragm is convex when the pressure difference is applied across the assembly whereby the diameter of the first end increases.

23. The flush valve of claim 22, wherein the first end of the orifice is defined by a first portion of the diaphragm.

24. The flush valve of claim 23, wherein the second end of the orifice is defined by a second portion of the diaphragm, and wherein the second portion is positioned adjacent the first portion.

25. The flush valve of claim 23, wherein the first portion includes a tapered surface.

26. The flush valve of claim 25, wherein the tapered surface is tapered at an angle of 45° from a horizontal plane passing through the diaphragm.

27. The flush valve of claim 22, wherein the diaphragm is made of a thermoplastic elastomer.

28. The flush valve of claim 22, wherein the diaphragm defines a central passageway in communication with the elongated barrel member.

* * * * *